2,956,056

PROCESS FOR PREPARING TRICHLOROCYANURIC ACID

John D. Christian, Memphis, Tenn., assignor to W. R. Grace & Co., New York, N.Y., a corporation of Connecticut No Drawing. Filed Feb. 14, 1958, Ser. No. 715,206

4 Claims. (Cl. 260—248)

The present invention relates to an improvement in the preparation of trichlorocyanuric acid.

In summary, the invention involves preparing trichlorocyanuric acid by adding an aqueous solution of alkali metal cyanurate, e.g., sodium cyanurate, containing alkali metal hydroxide, e.g., sodium hydroxide, slowly and with good mixing to a larger amount of cold water containing elemental chlorine therein, e.g., as a gas in stoichiometric excess over the amount of alkali metal cyanurate added thereto at a given time.

It is old in the art to prepare trichlorocyanuric acid by passing chlorine gas into a solution of cyanuric acid in potassium hydroxide. See Chattaway and Wadmore, J. Chem. Soc., 81, 200 (1902). These authors point out, however, that poor yields are obtained if amounts of cyanuric acid in excess of 3 grams are chlorinated by this technique. Analogous to Chattaway's work is the process reported by Hands and Whitte, J. Soc. Chem. Ind., 67, 66 (1948), and in Chem. Abs., 42, 4946g, in which a thin film of cyanurate solution is contacted with chlorine gas. This process permits treatment of sizable amounts of cyanurate, but the yield for the chlorination step is only 53% of theory.

It is, accordingly, one of the advantages of the instant invention that substantially any amount of alkali metal cyanurate in aqueous solution, e.g., cyanuric acid in a solution of alkali metal hydroxide, may be converted to trichlorocyanuric acid in excellent yield by the process of this invention. The crux of this invention lies in the addition of the solution of alkali metal cyanurate to the cold solution of chlorine.

It is essential in carrying out the process of this invention that the ratio of reaction medium (i.e., the chlorine solution containing any reaction product) be kept high in relationship to the alkali metal cyanurate present therein at a given moment. It has been found that the aqueous cyanurate solution can be added with good results at the rate of about 0.001 mol of cyanuric acid per minute to a reaction mixture of volume ranging from about 100 ml. to about 1,000 ml. An even greater volume of reaction mixture can be employed, but since trichlorocyanuric acid is slightly soluble in water the use of excess liquid presents a recovery problem.

As used herein, the term "reaction mixture" is intended to include the initial aqueous chlorine solution as well as the mixture resulting from adding any amount of the aqueous cyanurate solution to such initial solution.

The reaction is most conveniently carried out at atmospheric pressure but if desired it can be accomplished at superatmospheric or subatmospheric pressure.

The following example illustrates without limiting the invention.

Example 1

Into a chilled (5° C.) stirred aqueous solution (400 ml.) through which chlorine was continuously introduced an aqueous solution (250 ml.) of cyanuric acid (11.98 g.) and NaOH (20 g.) was introduced over a period of 1.5 hours. During this period the reaction mixture was maintained at 5–7° C. by external cooling. In order to maintain an excess of chlorine in the flask at all times a considerable excess of chlorine (total of 124 g.) was introduced. After the addition of the cyanurate solution the solids were filtered off and dried over $CaCl_2$. The product thus obtained (18.75 g.) analyzed 80.5% available chlorine indicating a yield of trichlorocyanuric acid 76.5% of theory.

Molecular chlorine ($Cl_2$) is defined as 100% "available" chlorine. Its bleaching action is due to the formation of hypochlorous acid as follows:

$$Cl_2 + H_2O \rightarrow HCl + HOCl \text{ (bleaching agent)}$$

The actual available chlorine content of a given weight of a bleaching compound is defined as the weight of molecular chlorine which has the same bleaching action divided by the weight of the compound as per the following formula:

Actual available chlorine of a bleaching compound in units of percent

Theoretical available chlorine is defined as follows:

Theoretical available chlorine of a compound in units of percent $$= \frac{Z}{\text{molecular weight of the compound}} \times 100$$

wherein Z equals 71 (number of moles of $OCl^-$ obtained from 1 mole of the compound on hydrolysis). For example, pure sodium hypochlorite (NaOCl) containing 47.6 wgt. percent chlorine, liberates one equivalent of $OCl^-$ on contact with water. Therefore, the theoretical available chlorine of sodium hypochlorite is $$\frac{71(1)}{74.5} \times 100 = 95.4\%$$

The preferred temperature range in carrying out the reaction is 0° to 10° C.; however, the reaction is operable at a temperature in the range of 0° to 25° C.

It is not essential that the aqueous solution be completely (100%) saturated with chlorine. At the point of mixing of the two reactant solutions, however, there should be present an excess of the theoretically required amount of chlorine.

With respect to the alkali metal cyanurate reactant it has been found desirable to have sufficient alkali metal hydroxide present in the solution to keep the cyanurate dissolved. A relatively small amount of excess alkali metal hydroxide is operable for this purpose. Sodium hydroxide is used in the example as the alkali metal hydroxide reactant; however any alkali metal hydroxide, e.g., potassium or lithium, can be used. This reactant solution can be formed by dissolving cyanuric acid in an aqueous solution of alkali metal hydroxide, or solid alkali metal cyanurate may itself be dissolved in a solution of alkali metal hydroxide. The final solution is identical in either case, i.e., an aqueous solution of trivalent cyanurate anions and alkali metal cations.

The probable reactions (with NaOH) are:

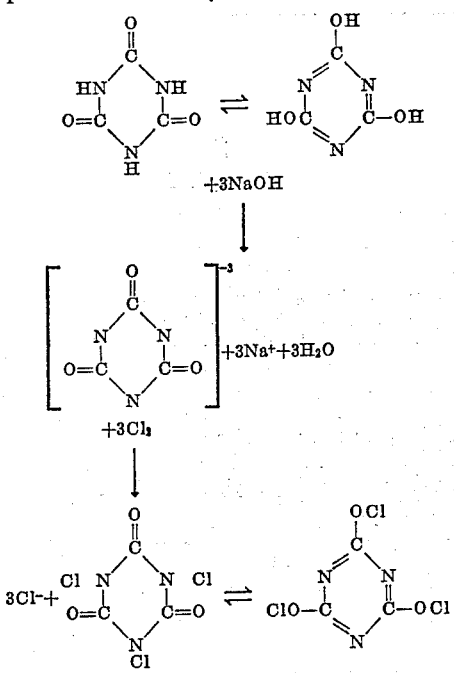

The structure of cyanuric acid has been the subject of argument in the literature; however recent work indicates that it exists largely in the iso form, with H attached to N. According to the literature, trichlorocyanuric acid is also largely in the iso form, so that the correct name is probably trichloroisocyanuric acid. The product prepared by the process of this invention, by whatever name, is identical to, and has the same uses of, the trichlorocyanuric acid prepared by the procedures of the prior art.

A convenient means of maintaining a stoichiometric excess of chlorine in the reaction mixture is to adjust the chlorine/cyanurate feed rate to at least slightly greater than three moles of chlorine per mole of cyanurate ions plus one mole of chlorine per mole of free NaOH contained in the cyanurate solution being added. This will ensure that any free NaOH is converted to NaOCl and still have sufficient chlorine to react with all the cyanurate ions. Within this embodiment, the necessary chlorine concentration can be simply and automatically maintained by passing chlorine into the reaction mixture at a rate in excess of that required to keep it saturated.

The product obtained from the employment of this invention, i.e., trichloroisocyanuric acid can be used as a bleaching agent, sanitizing agent, or as a chlorinating agent for organic compounds in the allylic position.

I claim:
1. In the method of preparing trichlorocyanuric acid by contacting an aqueous solution of alkali metal tricyanurate with chlorine, the improvement comprising adding the cyanurate solution to a cold aqueous solution of chlorine maintained at 0° to 25° C., the amount of chlorine in the said solution being in stoichiometric excess over the amount of alkali metal cyanurate present in the said solution at a given time.
2. The method according to claim 1 in which the reaction mixture is maintained at a temperature in the range of 5° to 7° C.
3. The method according to claim 2 in which the cyanurate solution is trisodium cyanurate containing sodium hydroxide.
4. The method according to claim 3 in which chlorine is passed into the reaction mixture at a rate in excess of the rate required to saturate the reaction mixture with chlorine.

References Cited in the file of this patent
UNITED STATES PATENTS 2,184,888    Muskat et al. _____ Dec. 26, 1939
2,607,738    Hardy _____ Aug. 19, 1952

OTHER REFERENCES

Chattaway: J. of the Chem. Soc., vol. 81p, page 200 (1902).

Hands et al.: J. of the Soc. of Chem. Industry, vol. 67, p. 67 (1948).